United States Patent [19]
Slayden

[11] Patent Number: 5,680,582
[45] Date of Patent: Oct. 21, 1997

[54] METHOD FOR HEAP COALESCING WHERE BLOCKS DO NOT CROSS PAGE OF SEGMENT BOUNDARIES

[75] Inventor: Glenn C Slayden, Redmond, Wash.

[73] Assignee: Microsoft Corporation, Redmond, Wash.

[21] Appl. No.: 430,446

[22] Filed: Apr. 28, 1995

Related U.S. Application Data

[63] Continuation of Ser. No. 811,018, Dec. 20, 1991, abandoned.

[51] Int. Cl.[6] .................................................. G06F 12/02
[52] U.S. Cl. ........................................ 395/497.02; 395/622
[58] Field of Search ........................... 395/497.52, 600, 395/622

[56] References Cited

U.S. PATENT DOCUMENTS

| 4,989,134 | 1/1991 | Shaw | 395/622 |
| 5,088,036 | 2/1992 | Ellis et al. | 395/622 |
| 5,159,678 | 10/1992 | Wengelski et al. | 395/480 |

OTHER PUBLICATIONS

Rick Grehan, "If Memory Serves . . .," Hands On–Some Assembly Required, BYTE, Aug. 1989, pp. 279–337.
Rick Grehan, "Virtually Virtual Memory," Hands–On Some Assembly Required, BYTE, Sep. 1990, pp. 455–464.
Lafore, Robert. "Assembly Language Primer for the IBM PC & XT". New York: New American Library, 1984: pp. 235–236 and 258–262, 1984.

*Primary Examiner*—Eddie P. Chan
*Assistant Examiner*—Reginald G. Bragdon
*Attorney, Agent, or Firm*—Jones & Askew

[57] ABSTRACT

A computer method and system for coalescing free space in a heap data structure. In preferred embodiments, the heap comprises a plurality of sequential pages (segments), and each page is logically divided into blocks of memory that are either free or allocated. Each block resides in a single page. According to the present invention, a source pointer and a destination pointer advance through the pages. The source pointer is advanced to point to an allocated block to be copied. The destination pointer is advanced to point to an area in which the block currently pointed to by the source pointer can be copied. The block pointed to by the source pointer is then copied to the area pointed to by the destination pointer, and the source and destination pointers are advanced. When the destination pointer advances to an area that is not large enough to hold the block pointed to by the source pointer, a free block is created out of the area.

10 Claims, 11 Drawing Sheets

METHOD FOR HEAP COALESCING WHERE BLOCKS DO NOT CROSS PAGE OF SEGMENT BOUNDARIES

CROSS-REFERENCE TO RELATED APPLICATION

This application is a continuation of U.S. patent application Ser. No. 07/811,018, filed Dec. 20, 1991 now abandoned.

TECHNICAL FIELD

This invention relates generally to a computer system for memory management and, more specifically, a method and system for coalescing free space in a heap.

BACKGROUND OF THE INVENTION

Many computer systems support the dynamic allocation of memory. Memory can be dynamically allocated among multiple tasks or during the execution of a single task. For example, a multi-tasking operating system may have a memory manager to allocate memory to the tasks. Also, some programming languages support memory management. A program may request the memory manager to allocate a block of memory of a given size. The memory manager determines which block of memory to allocate to the requesting program and passes to the requesting program a pointer or handle to allocated block. The program can then use that memory. When the program no longer needs the block, the program informs the memory manager. The memory manager typically deallocates (frees) the block to make it available to allocate when another request is received. The memory that memory manager manages is referred to as a "heap."

As memory is allocated and deallocated, the heap becomes fragmented, that is, blocks of free space occur between blocks of allocated space. While there may be enough free space to satisfy an allocation request it may not be contiguous. Also, the more fragmented the heap, the longer the time it may take to search the free space for a block to satisfy an allocation request. Many memory managers attempt to defragment, that is, compact or coalesce, the heap. The goal of coalescing is to move the allocated blocks together so as to merge the free space into a few large blocks rather than many small blocks.

The Intel 80×86 family of microprocessors have a segment addressing architecture. These processors have segment registers for holding segment selectors. The segment registers include a stack segment (ss), a code segment (cs), a data segment (ds), and an extra segment (es) register. When operating in a "protected mode," memory is addressed by a selector value, which is stored in a segment register, and an offset component. In protected mode, addresses are formed by adding the offset to the base address of the selector component. A selector value is an index into a descriptor table. The descriptor table contains the base address of a segment. When a segment register is loaded with a new selector value, the Intel processor retrieves an entry from the descriptor table using the selector as the index, determines the segment base address, and stores the segment base address in a segment descriptor cache. The segment descriptor cache holds the segment base address. When generating an address, the processor retrieves the value from the segment descriptor cache and adds an offset to produce the address. The loading of a segment register is a relatively slow process because of the steps involved in accessing the descriptor table and loading the segment descriptor cache. After the cache is loaded, however, the forming of addresses occurs quickly because the segment base address is already in the descriptor cache and can be quickly retrieved.

Prior art heap coalescing techniques are not well adapted to a segmented addressing architecture. These prior art techniques may result in excessive loading of the segment registers, which can cause performance problems during heap coalescing.

SUMMARY OF THE INVENTION

It is an object of the present invention to provide a method and system for heap coalescing.

It is another object of the present invention to provide a method for reducing the number of segment register loads during heap coalescing.

These and other objects, which will become apparent as the invention is more fully described below, are obtained by an improved method and system for heap coalescing. In a preferred embodiment, the heap comprises pages (each a segment) that contain a plurality of allocated or free blocks. The method uses a destination pointer and a source pointer to point to the blocks as they are being processed. Initially, the destination pointer is set to point to the first block and the source pointer is set to point to the first allocated block. The method determines the size of a destination area (working area) that is bounded by the destination pointer and the last location of the page. If the size of the destination area is large enough to hold the source block, then the source block is copied to the destination area, the source pointer is set to point to the next allocated block, and the destination pointer is set to point to the next location after the copied block. Otherwise, the destination area is made a free block and the destination pointer is set to the next location after the newly created free block. This process is repeated until the source pointer has pointed to all allocated blocks. The method then sets the memory past the destination pointer to free space.

DETAILED DESCRIPTION OF THE INVENTION

The present invention provides a method and system for coalescing a heap in a computer system. In preferred embodiments, a heap comprises a plurality of pages (segments) of memory. Each page contains one or more blocks of memory. Each block of memory can either be allocated or free. Each allocated block can either be locked or not locked. A block that is locked indicates that a program is currently accessing the block. Thus, a locked block cannot be moved during the coalescing process. In a preferred embodiment, each page has an associated linked list of free blocks.

Figure 1:
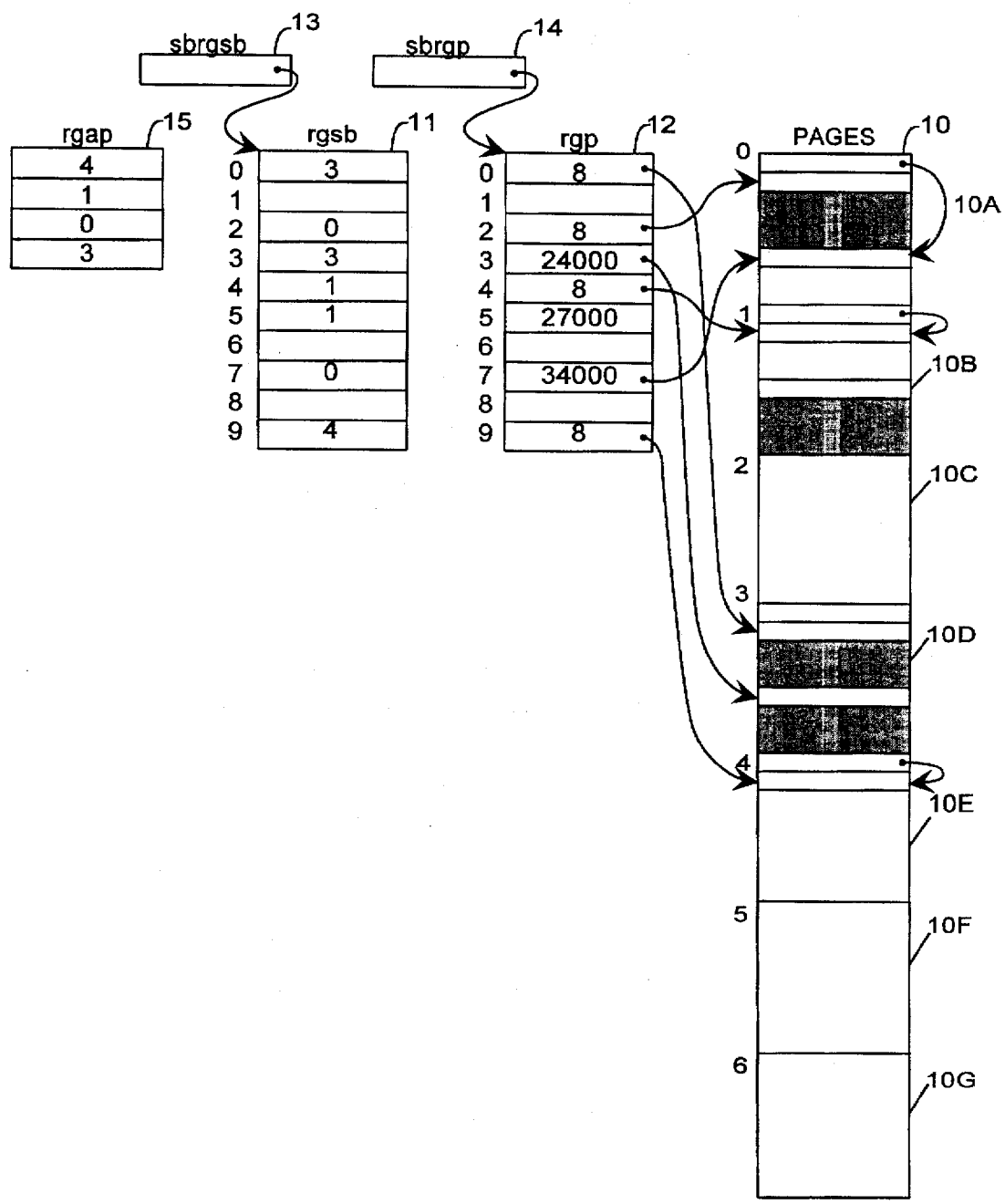
FIG. 1 is a diagram illustrating the data structures in a preferred embodiment of the present invention.

FIG. 1 is a diagram illustrating the data structures with sample data in a preferred embodiment of the present invention. The pages data structure 10 comprises seven pages 10A–10G. During memory allocation, the requesting program receives a handle to an allocated block. The handle is an index into parallel arrays rgsb 11 and rgp 12. These arrays contain the location of each allocated block in the pages data structure 10. The location of a block is identified by a segment selector value and an offset within the segment. Array rgsb 11 contains the segment selector for the allocated blocks, and array rgp 12 contains the offset of the block. For example, as shown in FIG. 1, array entry rgsb[4] contains the segment selector for the block associated with handle 4, and array entry rgp[4] contains the offset within the segment of the location of the block associated with handle 4. Handle 4 references the block that is in page 1 at offset 8. Pointers sbrgsb 13 and sbrgp 14 contains the segment selector for array rgsb 11 and rgp 12, respectively. Array rgap 15 contains a list of the segment selectors of the pages that contain blocks. Thus, as shown in FIG. 1, array rgap 15 contains segment selectors corresponding to pages 0, 1, 3, and 4, which are the only pages that contain blocks. Array rgap 15 also defines a logical ordering of the pages. As shown in FIG. 1, page 4 is the first and page 3 is the last. Pages 2, 5, and 6 as shown do not contain any blocks. Thus, they are not represented in array rgap 15. These pages could be released for other purposes than use in the heap.

Figure 2:
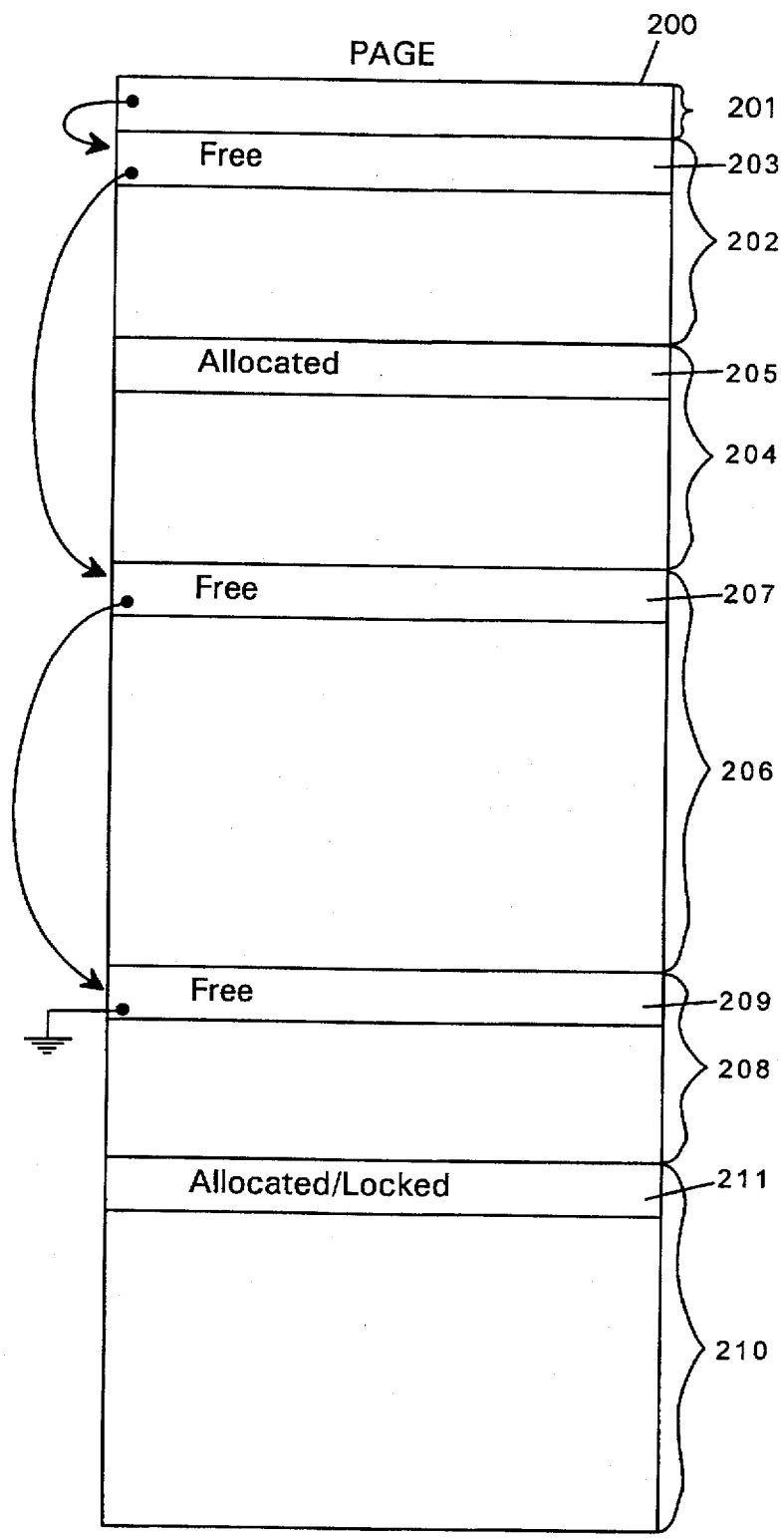
FIG. 2 illustrates the internal data structure for a page.

FIG. 2 illustrates the internal data structure for a page. Each page has a page header structure 201 stored at the beginning of the page that is defined in assembly language syntax as:

| PAGEHDR | struc |   |
|---------|-------|---|
| freelist | dw | ? |
| cbFree | dw | ? |
|   | dw | ? |
|   | dw | ? |
| PAGEHDR | ends |   |

Variable freeList contains the offset of the first free block in the page. In a preferred embodiment, variable freeList points not to the start of the block, but rather to the free-space link (blkNext) in the block (described below). Variable cbFree contains the total amount of free space in the page. In the example of FIG. 2, the page 200 contains five blocks 202, 204, 206, 208, and 210. Each block contains a block header and a data area. The block headers are stored at the beginning of the block and are defined as:

| BLKHDR | struc |   |
|--------|-------|---|
|   | dw | ? |
| blkflags | dw | ? |
| blkNext | dw | ? |
| blkSize | dw | ? |
| BLKHDR | ends |   |
| _BLKHDR | struc |   |
|   | dw | ? |
|   | db | ? |
| blkLock | db | ? |
| blkRef | dw | ? |
|   | dw | ? |
| _BLKHDR | ends |   |

The data structure BLKHDR defines the header for free blocks, and data structure _BLKHDR redefines certain variables in the header for allocated blocks. Variable blkFlags indicates whether a block is allocated or free and locked or not locked. Variable blkNext contains the offset of variable blkNext in the next free block of the page. Variable blkSize contains the size of the data area within the block. The total size of a block is the size of the data area plus the size of the block header. Variable blkLock redefines a portion of variable blkFlags and contains the lock count of the block, that is the number of programs, processes, threads, etc. that have the block locked. Variable blkRef contains a the handle of the block for cross-referencing into the arrays rgsb and rgp. In the example of FIG. 2, blocks 202, 206, 208 are free blocks. The free blocks are linked together through variable blkNext. Variable freeList in the page header points to the head of the linked list of the free blocks. The last free block in a page has variable blkNext set to 0 to indicate the end of the linked list. Blocks 204 and 210 are allocated with block 204 being not locked and block 210 being locked.

Figure 3:
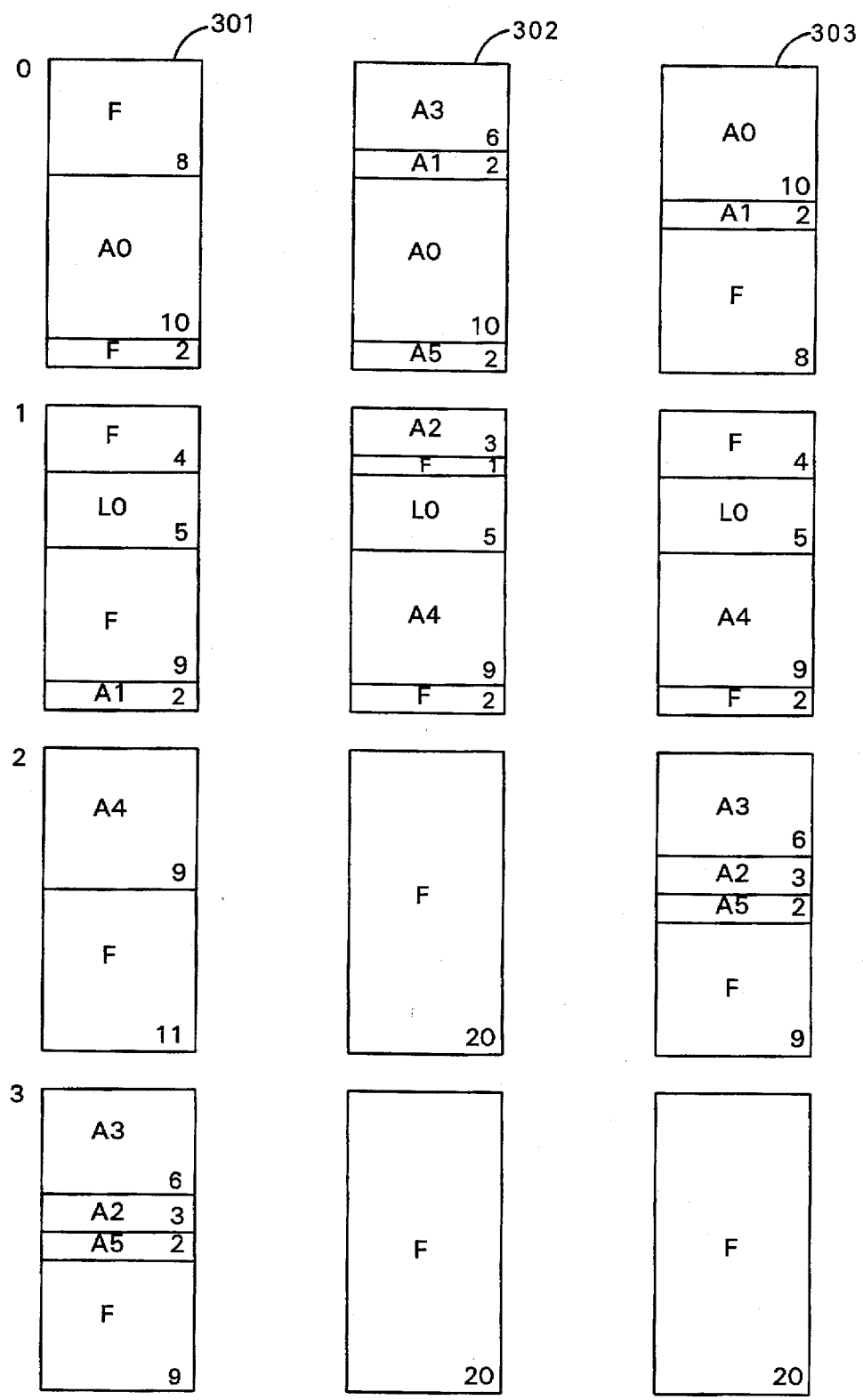
FIG. 3 shows the results of coalescing using methods of prior systems and the present invention.

FIG. 3 shows the results of coalescing using methods of prior systems and the present invention. Heap 301 contains 4 pages, pages 0, 1, 2, and 3. In the example of FIG. 3, each page contains 20 units of storage. The size of each block is shown in the lower corner of the block. Each block is identified as to whether it is free ("F") allocated (e.g., "A0"), or locked ("L0"). For example, page 1 contains 4 blocks: a free block of size 4, a locked block (L0) of size 5, a free block of size 9, and an allocated block (A1) of size 2. Heap 302 shows the results after coalescing using a prior method. This prior method first scans each of the pages to create a list sorted by size of allocated blocks that are not locked. The prior method then uses an optimum compaction algorithm to determine where to move the allocated blocks. According to this prior method, the number of segment register loads is on the order of 2 times the number of pages plus the number of allocated blocks (O(2*pages+allocated blocks)). Heap 303 shows the results after coalescing using the methods of the present invention. Although the methods of the present invention do not always achieve optimal compaction, the methods reduce the number of segment register loads. As described below, the number of segment register 10 ads is on the order of 2 times the number of pages (O(2* pages)).

Figure 4:
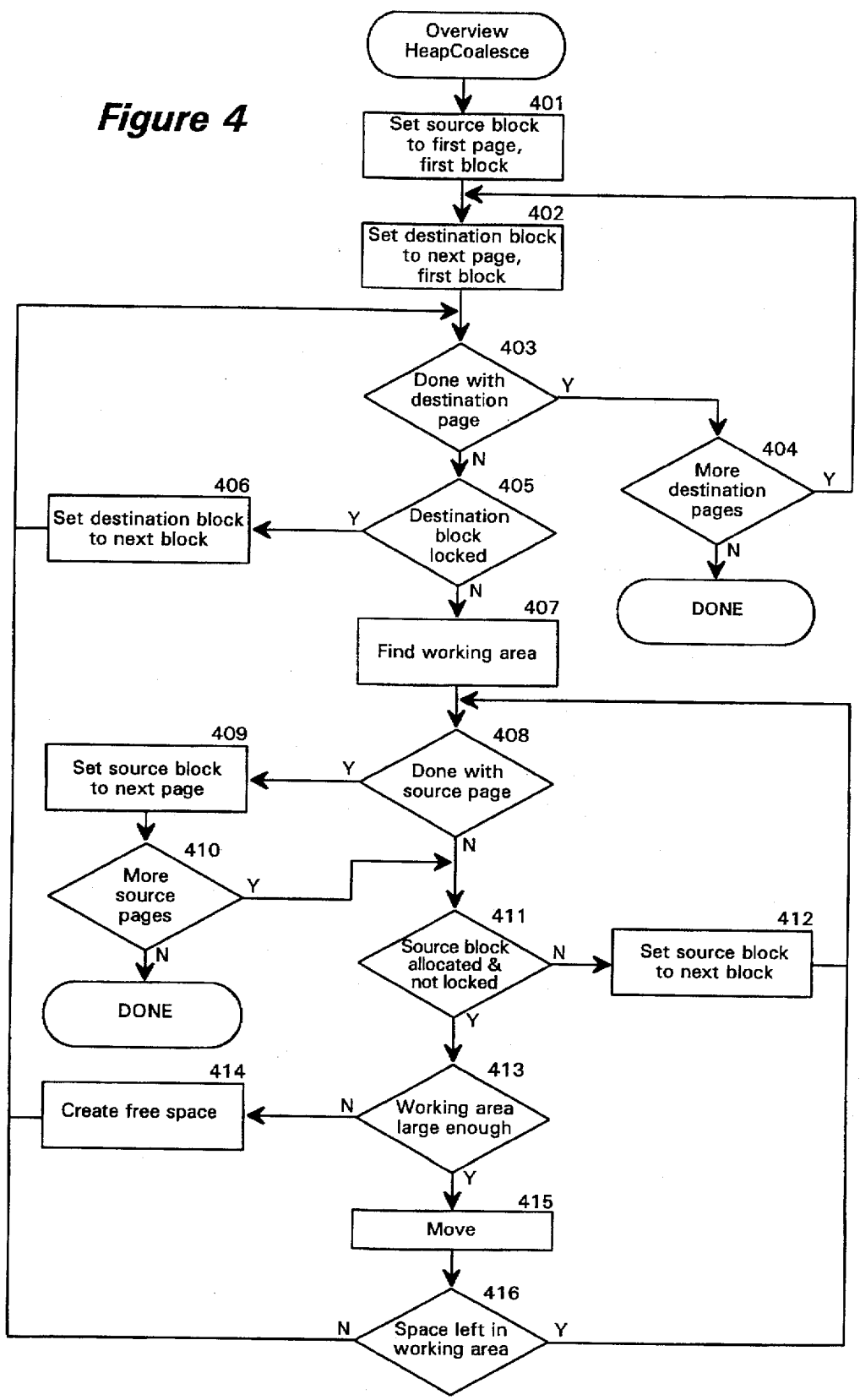
FIG. 4 is an overview flow diagram of the heap coalescing methods of a preferred embodiment of the present invention.

FIG. 4 is an overview flow diagram of the heap coalescing methods of a preferred embodiment of the present invention. During the coalescing process, the page to which data is moved is referred to as a destination page, and the page from which data is moved is referred to as the source page. Associated with the destination page is a destination offset, which is the offset of a destination block within the destination page to which a source block is to be copied. Associated with the source page is a source offset, which is the offset of the start of the block to be copied within the source page. In a preferred embodiment on a 80×86 processor, the segment selector for the destination page is stored in register es, and the offset of the destination block within the destination page is stored in register di. The segment selector for the source page is stored in register ds, and the offset of the source block within the source page is stored in register si. Because some of the efficiencies of the present invention are attributable to the manner in which certain registers are used, it is preferable that the methods be implemented using an assembly language rather than a higher level language such as "C." In the following, the destination segment and offset (es:di) are referred to as the destination pointer, and the source segment and offset (ds:si) are referred to as the source pointer. The methods of the present invention advance the destination and source pointers through the pages starting from the first page. The source pointer advances to the next allocated block that is not locked. The destination pointer advances to the next block that is not locked. If the area (working area) between the destination pointer and the end of the page or the next locked block on the page, whichever is smaller, is large enough to hold the source block, then the source block is copied to the destination block and the source and destination pointers are advanced to the end of the copied from and the end of the copied to blocks, respectively. If the working area is not large enough, a free block is created out of the working area and the destination pointer is advanced. This process continues until the destination pointer and the source pointer advance through all pages. Because the working area is defined to be within the same page as the destination pointer, the number of segment register loads is reduced. In step 401, the system sets the source page and block to the first block in the first page. In step 402, the system sets the destination page and block to the first block in the next page, initially the next page is the first page. In step 403, if there are no more blocks in the destination page, then it is time to advance to the next destination page and the system continues at step 404, else the system continues at step 405. In step 404, if there are more destination pages, then the system loops to step 402 to select the next destination page, else the coalescing is complete. In step 405, if the destination block is locked, then the system skips over the block by continuing at step 406, else the system continues at step 407. In step 406, the system sets the destination block to the next block and loops to step 403. In step 407, the system determines the size of the working area as described above. In steps 408 through 416, the system loops moving source data into the working area. In step 408, if there are no more blocks in the source page, then the system advances to the next source page by continuing at step 409, else the system continues at step 411. In step 409, the system sets the source block to the first block in the next page. In step 410, if there are more source pages, then the system continues at step 411, else the coalescing is complete. In a preferred embodiment, before completion of the coalescing, the method creates free blocks between the destination block and the last page. In step 411, if the source block is allocated and not locked, then the system continues at step 413, else the system continues at step 412. In step 412, the system sets the source block to the next block and loops to step 408. In step 413, if the working area is large enough to hold the source block, then the system continues at step 415, else it continues at step 414. In step 414, the system creates a free space of the working area, which advances the destination block, and loops to step 403. In step 415, the system moves the source block to the working area. In a preferred embodiment, the system simply uses the "rep movsw" instruction of the 80×86 processors, which automatically advances both the source and destination pointers. In a preferred embodiment, the es and ds registers contain the appropriate values for the move. In certain situations, as discussed more fully below, the registers may need to be used for other purposes in which case they may need to be reloaded. Alternatively, if the Intel processor has additional data segment registers (fs or gs) then these registers can be used for the other purposes. This would obviate the need to reload. In step 416, if there is space left in the working area after the move, then system loops to step 408 to process the next source block, else the system loops to step 403 to process the next destination block.

Figure 5A:
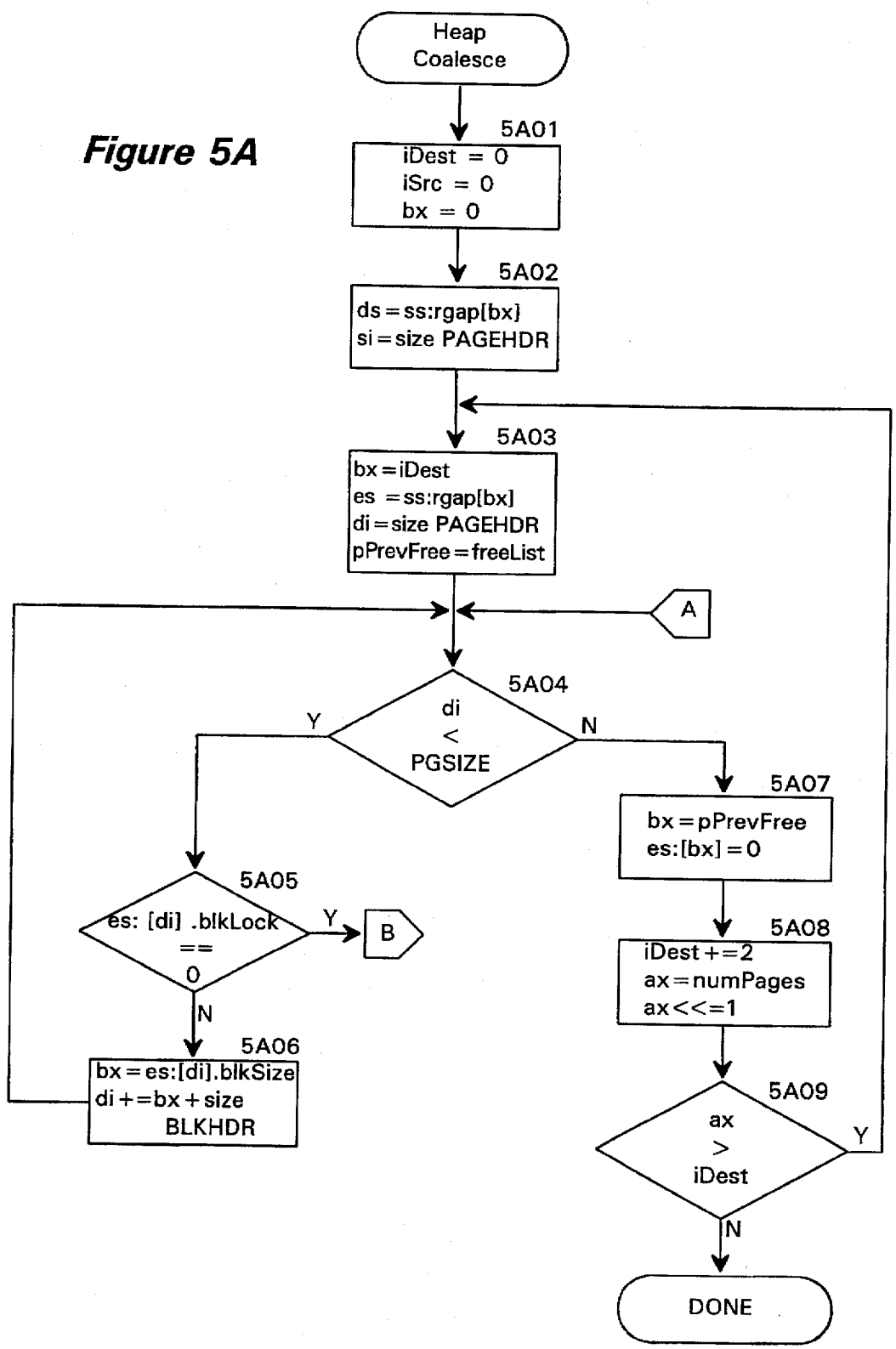
FIGS. 5A through 5E comprise a detailed flow diagram of the heap coalescing methods of a preferred embodiment of the present invention.

FIGS. 5A through 5E comprise a detailed flow diagram of the heap coalescing methods of a preferred embodiment of the present invention. In a preferred embodiment, register pair es:di contains the destination pointer, and register pair ds:si contains the source pointer. FIG. 5A shows the initialization of the source and destination pointers and the advancement of the destination pointer to a block that is not locked.

The following table contains the definition of the symbols used in the flow diagrams.

| Symbol | Meaning |
| --- | --- |
| = | equality |
| += | addition assignment |
| −= | subtraction assignment |
| <<= | left-shift assignment |
| ++ | increment |
| >>= | right-shift assignment |
| |= | bitwise-inclusive-OR assignment |

In step 5A01, the system initializes variables iDest and iSrc and register bx to 0. Variables iDest and iSrc index into array rgap, which contains the selectors of the pages. These variables allow the destination and source pointers to proceed through the pages in the order defined in array rgap. Register bx is used to index array rgap. In step 5A02, the system sets register ds to contain the segment selector stored in rgap[bx] and sets register si to contain the size of the structure PAGEHDR, which points register pair ds:si to the first block in the first page. In step 5A03, the system sets register bx to variable iDest, sets register es to contain the segment selector stored in rgap[bx], and sets register di to contain the size of the structure PAGEHDR, which sets register pair es:di to point to the first block in the page indexed by variable iDest. The system also sets variable pPrevFree to point to variable blkNext in the first free block in the destination page. In step 5A04, if the contents of register di is less than the constant. PGSIZE (page size), then the system has not passed the last block in the destination page and continues at step 5A05, else the system continues at step 5A07. In steps 5A05 and 5A06, the system loops searching for a block that is not locked. In step 5A05, if es:[di].blkLock equals 0, then the destination block is not locked and the system continues at step 5B01 of FIG. 5B, else the system continues at step 5A06. In step 5A06, the system sets register bx to es:[di].blkSize and adds the contents of register bx and the size of the block header to register di, which load register di with the offset to the next block in the destination page. The system then loops to step 5A04 to check if the system has passed the last block in the destination page. In steps 5A07 through 5A09, the system terminates the linked list of free space in the destination page, advances to the next destination page, and completes if all destination pages have been processed. In step 5A07, the system loads register bx with the contents of variable pPrevFree and sets es:[bx] to 0, which terminates the linked list of free blocks for the destination page. The variable pPrevFree points to the offset, in the last free block, of the blkNext field. In step 5A08, the system sets variable iDest to index the next entry in array rgap by adding 2, loads register ax with variable numPages (which contains the number of pages in array rgap), and multiplies the contents of ax by 2 (bytes per entry) to determine the last entry in array rgap. In step 5A09, if the contents of register ax is greater than variable iDest, then there are more destination pages to process and the system loops to step 5A03 to process the next destination page, else the system has completed the coalescing.

Figure 5B:
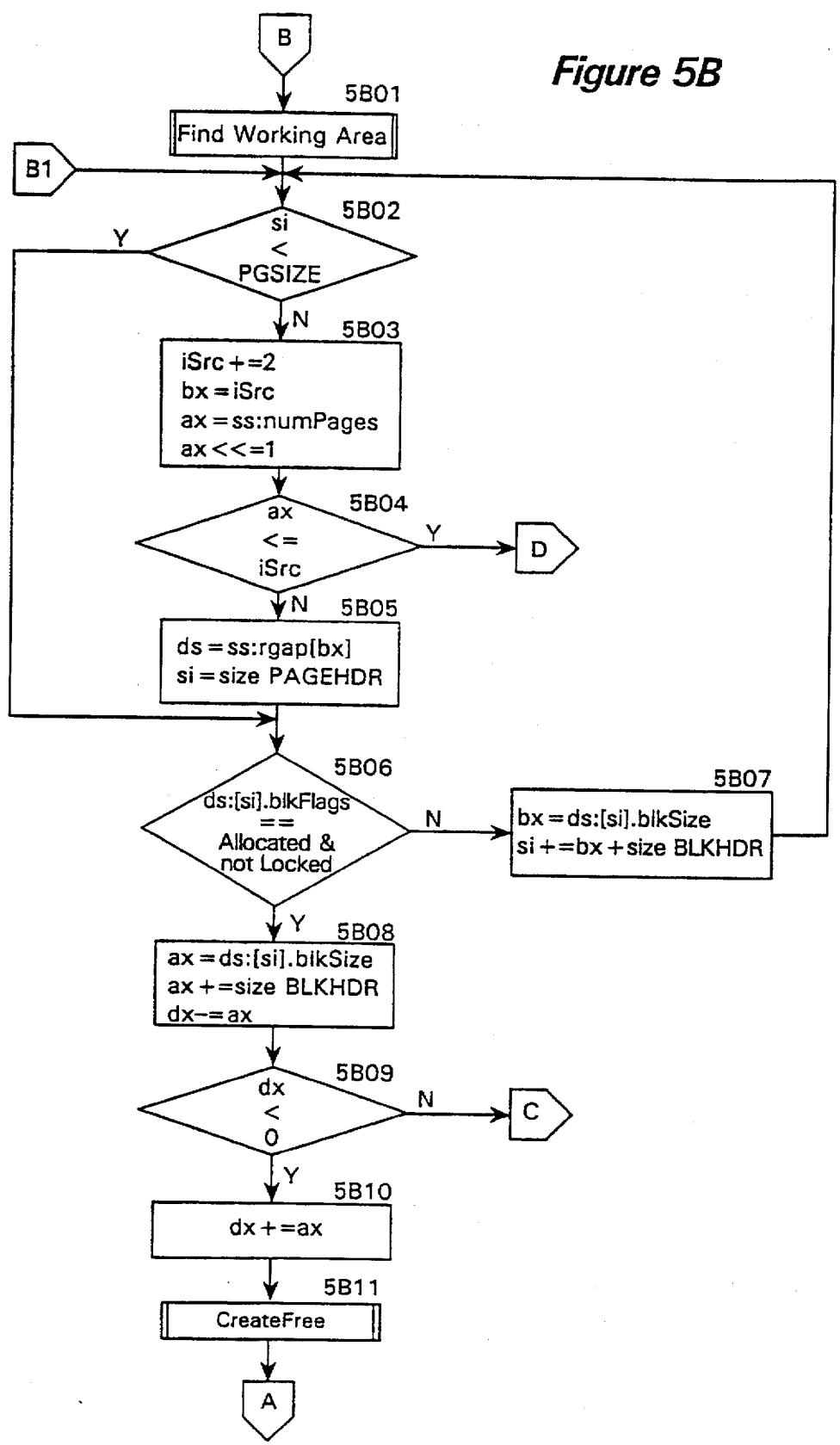

FIG. 5B shows determining the size of the working area, advancing the source pointer to the next allocated block that is not locked, and determining if the working area is large enough to hold the source block. In step 5B01, the system invokes subroutine FindWorkingArea to determine the size of the working area. The subroutine returns the size of the working area in register dx. In step 5B02, if the contents of register si is less than constant PGSIZE, then the system has not passed the last block in the source page and the system continues at step 5B06, else the system continues at step 5B03. In step 5B03, the system sets the variable iSrc to index the next entry in array rgap by adding 2, loads register bx from variable iSrc, loads register ax with variable numPages, and multiplies the contents of register ax by 2 to determine the last entry in array rgap. In step 5B04, if register ax is less than variable iSrc, then there are no more source pages to process and the system continues at step 5D01 in FIG. 5D, else the system continues at step 5B05. In step 5B05, the system loads register ds with array entry rgap[bx] and loads register si with the size of the page header, which sets the register pair ds:si to point to the first block in the next source page. In step 5B06, if the variable blkFlags of the source block indicates that the source block is allocated and not locked, then the system continues at step 5B08, else the system continues at step 5B07. In step 5B07, the system skips the source pointer over free blocks and locked blocks. The system loads register bx with variable blkSize of the source block, adds register bx and the size of the block header to register si, and loops to step 5B02 to determine if the source pointer points past the source page. In steps 5B08 and 5B09, the system determines if the working area is large enough to hold the source block. In step 5B08, the system loads register ax with the variable blkSize of the source block and adds the size of the block header to register ax to determine the size of the source block. The system then subtracts the size of the source block from the size of the working area (register dx) to determine whether the working area is large enough to hold the source block. In step 5B09, if register dx is less than 0, then the working area is not large enough and the system continues at step 5B10, else the system continues at step 5C01 in FIG. 5C to move the source block to the working area. In step 5B10, the system restores the size of the working area by adding back register ax to register dx. In step 5B11, the system calls routine CreateFree to create a free block out of the working area and the routine loops to step 5A04 of FIG. 5A to select the next destination pointer.

Figure 5C:
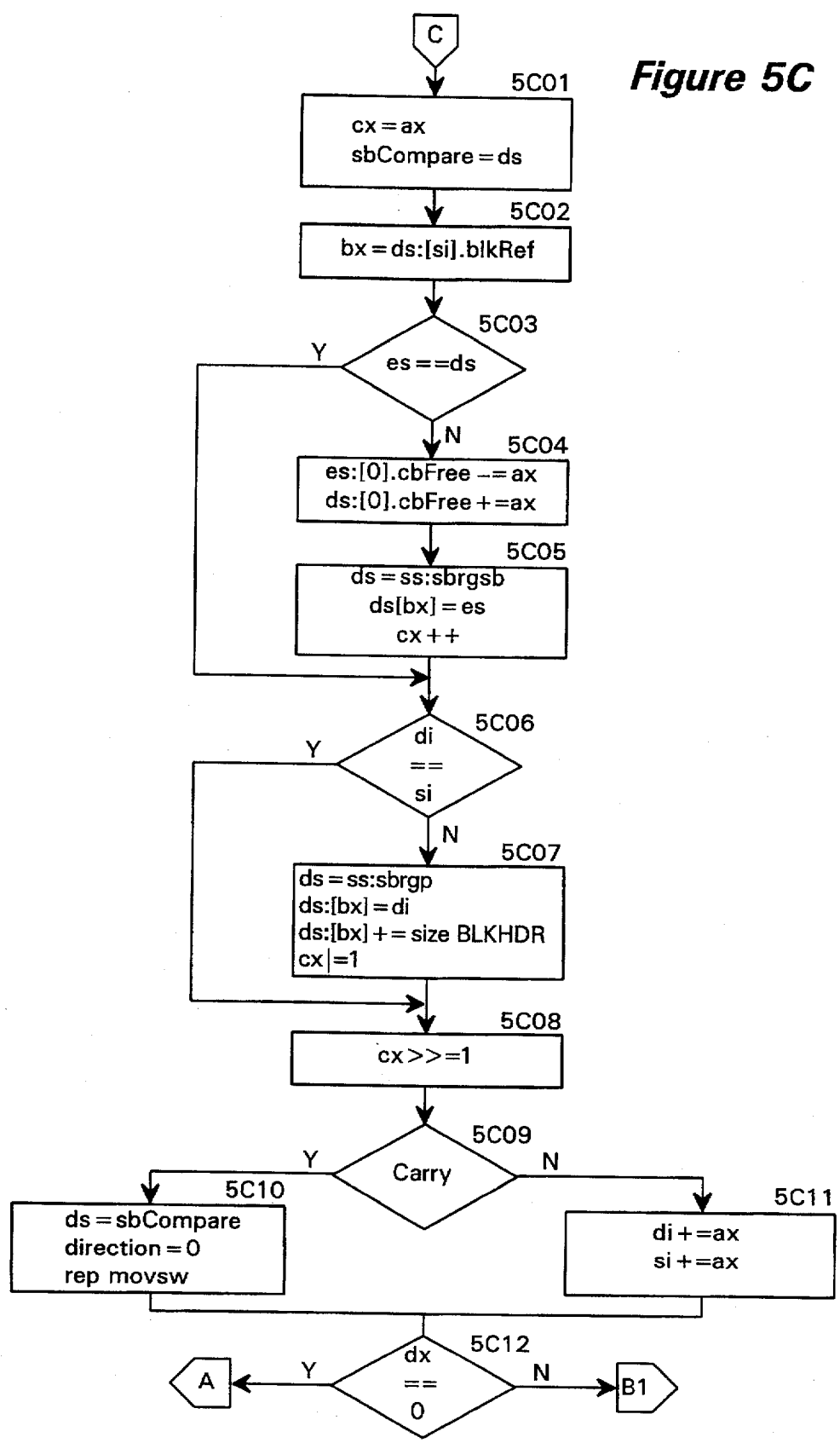

FIG. 5C shows adjusting the handle mapping for the source block and moving the source block to the working area. In steps 5C01 through 5C03, the system determines if the source and destination blocks are in the same page. In step 5C01, the system loads register cx from register ax (size of source block), and sets variable sbCompare to register ds (source segment selector). In step 5C02, the system loads register bx with the handle of the source block. In step 5C03, if register es equals register ds, then the destination and source blocks are in the same page and the system continues at step 5C06, else the system continues at step 5C04. In step 5C04, the system subtracts register ax from variable cbFree of the destination block and adds register ax to variable cbFree in the source block to adjust the amount of free space in the destination and source pages. In step 5C05, the system adjusts the handle mapping for the source block by changing the reference segment selector in array rgsb to point to the destination segment selector and also sets a flag to indicate actual block movement. In a preferred embodiment, the system adjusts the handle by loading register ds from variable sbrgsb and storing register es into memory location ds:[bx], and sets a flag by incrementing register cx. Alternatively, if an additional code segment register is available, such as the register fs or gs on the Intel 80386, it can be used rather than the register ds to store the selector array rgsb. In step 5C06, if register di equals register si, then the offset of the source page does not change and the system continues at step 5C08, else the system continues at step 5C07. In step 5C07, the system adjusts the handle mapping for the source block by changing the offset in array rgp for the source block to point to the destination offset and also sets a move flag indicating actual block movement. The system loads register ds with variable sbrgp (the segment base address of array rgp), stores register di in memory location ds:[bx], adds the size of the block header to memory location ds:[bx], and logically-Ors a 1 with register cx. In step 5C08, the system shifts register cx right 1 bit into the carry bit, which saves the move flag into the carry bit and divides register cx by 2 to give the number of words to move. In step 5C09, if carry bit (move flag) is set, then the system continues at step 5C10, else the system continues at step 5C11. In step 5C10, the system initializes registers for the move and moves the source block to the destination block by loading register ds with variable sbCompare (source segment selector), sets the direction of the move, and executes the "rep movsw" instruction of the 80×86 processors. In step 5C11, the system simulates a move by advancing the source and destination block pointers by adding register ax to both registers di and si. In step 5C12, if register dx equal 0, then no room is left in the working area and the system loops to step 5A04 of FIG. 5A to get the next destination block, else the system loops to step 5B02 of FIG. 5B to get the next source block.

Figure 5D:
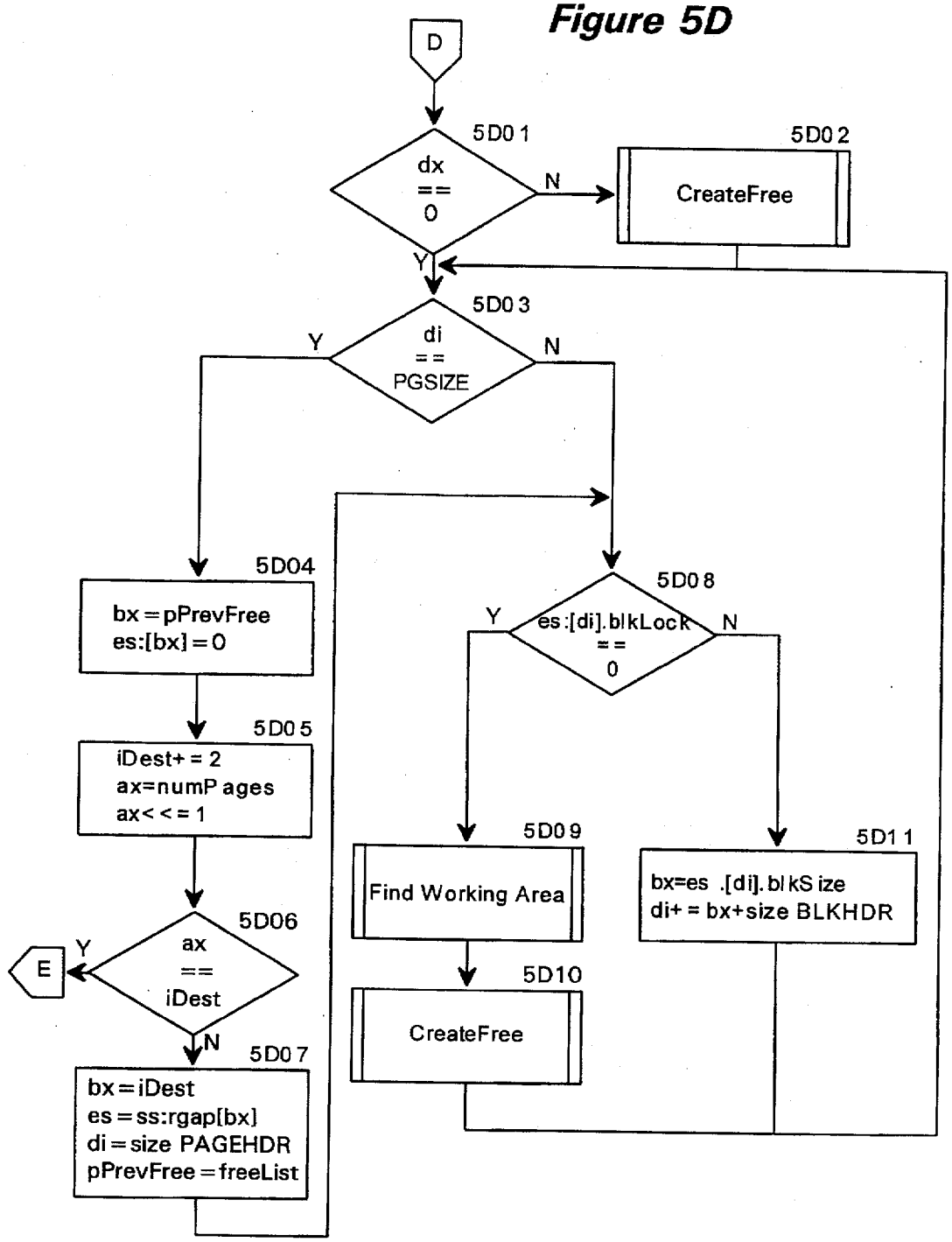

FIG. 5D shows creating of free space of the working area and advancing the destination pointer while creating free space around locked blocks. In step 5D01, if register dx is greater than 0, then the working area was not completely filled by the last move and the system continues at step 5D02, else the system continues at step 5D03. In step 5D02, the system invokes subroutine CreateFree to create a free space of the remaining working area. In steps 5D03 through 5D11, the system advances through the pages creating free blocks. In step 5D03, if register di is equal to the page size, then the destination page has been processed and the system continues at step 5D04, else the system continues at 5D08. In step 5D04, the system loads register bx from variable pPrevFree and stores a 0 in memory location es:[bx] which terminates the free list of the destination page. In step 5D05, the system advances to the next destination page by adding 2 to variable iDest, loading register as from variable numPages, and multiplying register ax by 2. In step 5D06, if register ax equals variable iDest, then all the destination pages have been processed and the system continues at step 5E01 of FIG. 5E, else the system continues at step 5D07. In step 5D07, loads register bx from variable iDest, loads register es from rgap[bx] (destination segment selector), loads register di with the size of the page header, and sets variable pPrevFree to point to variable freeList in the destination page. In steps 5D03 and 5D08 through 5D11, the system loops processing each block in the destination page. In step 5D08, if the destination page is not locked, then the system continues at step 5D09, else the routine continues at 5D11. In step 5D09, the system invokes subroutine FindWorkingArea to determine the size of the working area. In step 5D10, the system invokes subroutine CreateFree to create a free space out of the working area and the system loops to step 5D03 to process the next block. In step 5D11, the system skips over the locked block by loading register bx from ex:[di].blkSize and adding register bx plus the size of the block header to register di and loops to step 5D03 to process the next block.

Figure 5E:
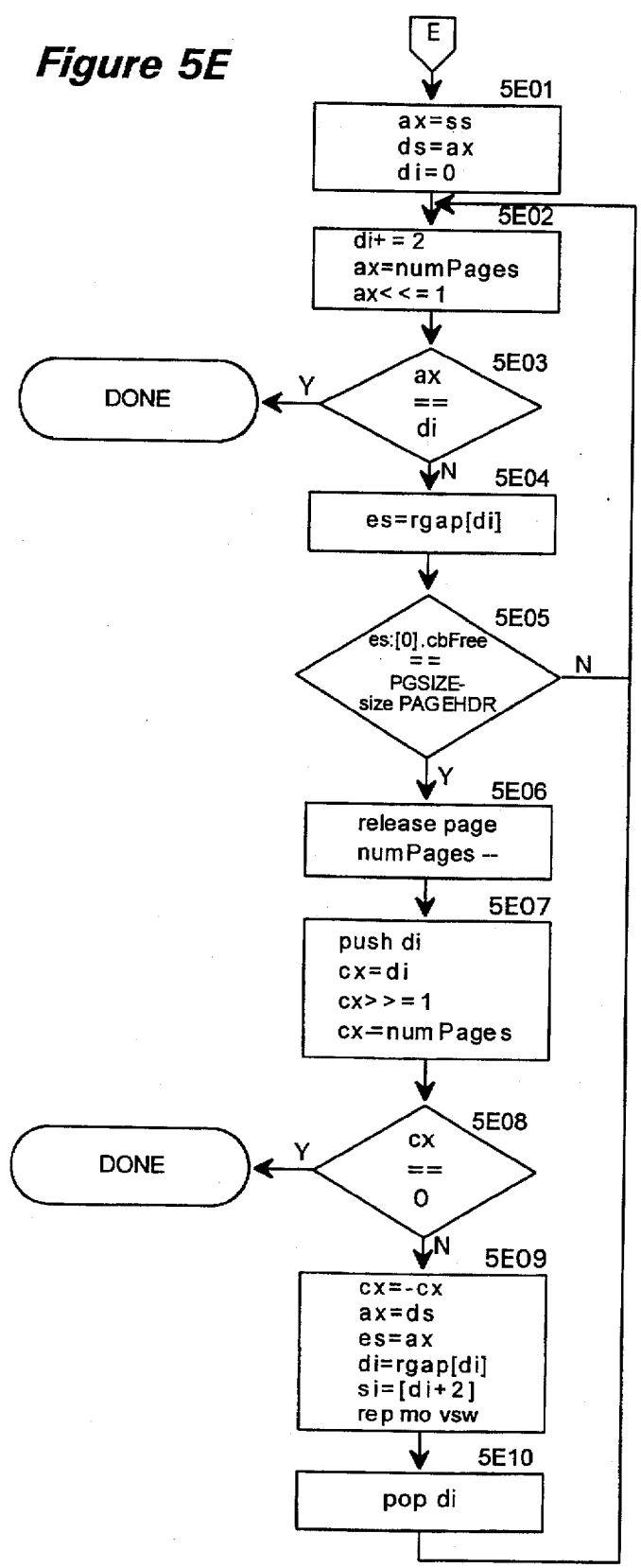

FIG. 5E shows releasing of pages that contain only free space and removing the corresponding array rgap entry. In step 5E01 through 5E10, the system loops through each entry in array rgap to determine if the corresponding page contains only free space. If it does, the system releases the page and removes the corresponding entry from array rgap. The system will not free the page corresponding to array entry rgap[0]. This ensures that one page will always be available even if it contains only free space. In step 5E01, the system initializes for the looping by loading register ax from register ss, loading register ds from register ax, and loading register di with 0. In steps 5E02 and 5E03, the system determines whether all the entries in array rgap have been processed. In step 5E02, the system adds 2 to register di to skip over the first entry, loads register ax from variable numPages, and multiples register ax by 2. In step 5E03, if register ax equals register di, then all the array rgap entries have been processed and the coalescing is complete, else the routine continues at step 5E04. In step 5E04, the system loads register es from array entry rgap[di]. In step 5E05, if the free space count of the selected page equals the page size minus the size of the page header, then the page contains only free space and the system continues at step 5E06, else the system loops to step 5E02 to process the next page. In step 5E06, the system releases the selected page and decrements variable numPages. In steps 5E07 through 5E10, the system removes the array entry corresponding to the selected page from array rgap by using the "rep movsw" instruction. In step 5E07, the system pushes register di onto the stack, loads register cx from register di, multiplies register cx by 2, and subtracts variable numPages from register cx. In step 5E08, if register cx equals 0, then the selected page is the last in array rgap and the coalescing is complete, else the system continues at step 5E09. In step 5E09, the system loads register cx with the negative of itself, loads register ax from register ds, loads register es from register ax, load register di from array entry rgap[di], loads register si with register di plus 2, and executes the "rep movsw" instruction. In step 5E10, the system pops the stack into to register di and loops to step 5E02 to process the next page.

Figure 6:
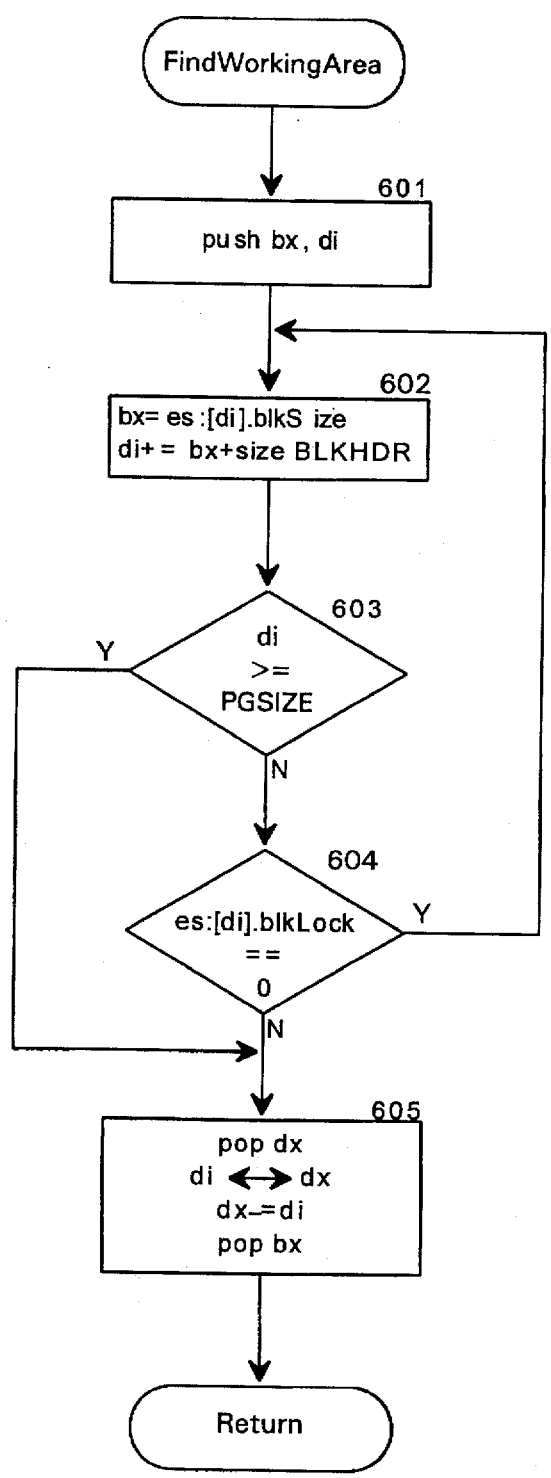
FIG. 6 is a flow diagram of routine FindWorkingArea.

FIG. 6 is a flow diagram of routine FindWorkingArea. The working area is defined as the area between the destination pointer and next lock block in the destination page and if there is none, the end of the destination page. The routine returns with the length of the working area in register dx. In step 601, the system pushes registers bx and di onto the stack. In steps 602 through 604, the system loops searching for a locked block or end of the page. The system uses register di to advance through the page. In step 602, the system advances register di to point to the next block by loading register bx with variable blkSize of the current block and adds register bx plus the size of the block header to register di. In step 603, if register di is greater than or equal to the page size, then the system is at the end of the page and continues at step 605, else the system continues at step 604. In step 604, if variable blkLock of the current block is 0, then the block is not locked and the system loops to step 602 to process the next block, else the system continues at step 605. In step 605, the system pops register dx from the stack, exchanges registers di and dx, subtracts register di from register dx to give the size of the working area, pops register bx from the stack, and returns.

Figure 7:
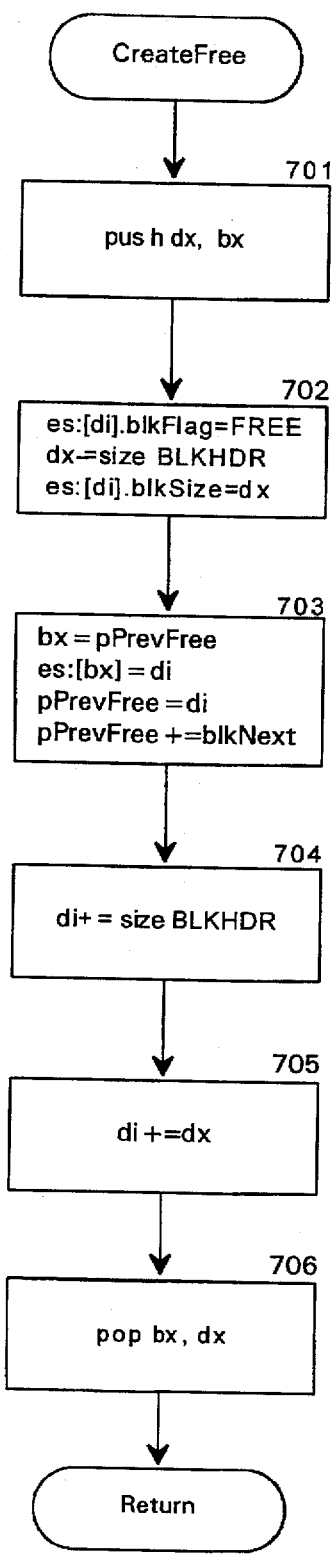
FIG. 7 is a flow diagram of routine CreateFree.

FIG. 7 is a flow diagram of routine CreateFree. The routine creates a free block starting from the location pointed to by register pair es:[di] of the size in register dx. The routine updates the pointer pointed to by variable pPrevFree to point to variable blkNext in the newly created free block. In step 701, the system pushes registers dx and bx onto the stack. In step 702, the system sets the variable blkFlag of the destination block to free, subtracts the size of the block header from register dx, and stores register dx into variable blkSize of the destination block. In step 702, the system links the newly created free block by loading register bx with variable pPrevFree, storing register di into memory es:[bx], storing register di into variable pPrevFree, and adding the offset of variable blkNext in the free block to variable pPrevFree. In step 704, the system adds the size of the block header to register di, which gives the offset of the data. In step 705, the system adds register dx to register di to give the offset of the next block, In step 706, the system pops registers bx and dx from the stack and returns.

Although the present invention has been described in terms of preferred embodiments, it is not intended that the invention be limited to these embodiments. Modifications within the spirit of the invention will be apparent to those skilled in the art. The scope of the present invention is defined by the claims that follow.

I claim:

1. A method in a computer system for heap coalescing, the computer system having a heap with segments, each segment having a plurality blocks that are either allocated or free, the computer system having a source segment register and a destination segment register for indicating a source segment from which an allocated block is to be copied and a destination segment to which an allocated block is to be copied, the method comprising copying each allocated block to a portion of the heap wherein when an allocated block will not fit within the destination segment pointed to by the destination segment register, setting the destination segment register to point to another destination segment so that each copied allocated block is contained entirely within one segment, wherein the copied blocks are contiguous to the extent that each copied block is contained within one segment, and wherein when copying the allocated blocks, the source segment register is loaded only once for each segment and the destination segment register is loaded only once for each segment to which an allocated block is copied.

2. The method of claim 1 wherein the segments are logically ordered from a first segment to a last segment, the copying includes:

loading the destination segment register with an indication of the first segment; and for each of the plurality of segments starting with the first segment through the last segment, loading the source segment register with an indication of the segment; and for each of the plurality of allocated blocks within the segment indicated by the source segment register, when the allocated block will not fit within the segment indicated by the destination segment register, loading the destination segment register with an indication of the segment logically ordered after the segment currently indicated by the destination segment register; and copying the allocated block to the segment indicated by the destination segment register.

3. A method for heap coalescing in a computer system, the heap having a plurality of memory locations, the memory locations being logically ordered from a first location to a last location in the heap, the memory locations being logically grouped into a plurality of pages, the pages being logically ordered from a first page to a last page, the memory locations within a page being logically grouped into a plurality of blocks, the blocks within a page being logically ordered from a first block to a last block, each block having a size, each block being either allocated or free, the method comprising the steps of:

setting a destination pointer to point to the first location in the first block;

setting a source pointer to point to the first allocated block;

until the source pointer has pointed to all the allocated blocks, repeating the steps of:

determining a size of a destination area, the destination area being bounded by the location pointed to by the destination pointer and the last location in the page that contains the location pointed to by the destination pointer;

when the size of the block pointed to by the source pointer is smaller than or equal to the size of the destination area, copying the block pointed to by the source pointer to the destination area, setting the source pointer to point to the next allocated block, and setting the destination pointer to point to a location in the destination area after the copied block; and when the size of the block pointed to by the source pointer is larger than the size of the destination area, creating a free block of the destination area and setting the destination pointer to point to a location after the destination area; and creating free blocks out of the area bounded by the location pointed to by the destination pointer and last location in the heap.

4. The method of claim 3 wherein an allocated block is either locked or not locked and wherein the steps of setting the source pointer skip over locked blocks and the steps of setting the destination pointer skip over locations corresponding to locked blocks.

5. The method of claim 4 wherein the destination area is bounded by a locked block, the locked block being between the location pointed to by the destination pointer and the last location in the page that contains the location pointed to by the destination pointer.

6. A method in a computer system for coalescing memory in a heap, the memory organized into ordered segments of logically contiguous locations, each location addressed by a segment address and an offset, each segment being logically divided into ordered blocks, each block being either allocated or free, an allocated block being locked or not locked, the computer having a source segment register, a source offset register, a destination segment register, and a destination offset register, the method comprising the steps of:

(a) loading the source segment register with the base address of the first segment and loading the source offset register with the offset of the first block in the first segment;

(b) loading the destination segment register with the base address of the first segment and loading the destination offset register with the offset of the first block in the first segment;

(c) determining a size of a working area, the working area being an area from the location pointed to by the destination offset register to the end of the segment pointed to by the destination segment register or to the start of the next locked block within the segment pointed to by the destination segment register;

(d) when the working area is not large enough to hold the block pointed to by the source segment register and the source offset register, creating a block of the working area and setting the state of the created block to free, and setting the destination segment register and the destination offset register to point to the next block that is not locked; and (e) when the working area is large enough to hold the block pointed to by the source segment register and the source offset register, copying the block pointed to by the source segment register and the source offset register to the working area, setting the source segment register and the source offset register to point to the next allocated block that is not locked, and setting the destination segment register and the destination offset register to point to the first location after the copied block that is not in a locked block; and (f) repeating steps (c), (d), and (e) until the source segment register and source offset register have been set to point to all the allocated blocks that are not locked.

7. A method of memory compaction in a computer system, the computer system having a ds:si register pair and an es:di register pair, the memory organized into ordered segments of logically contiguous locations, each segment comprising ordered blocks, each block being allocated or free, each block having a size, the method comprising the steps of:

loading the ds:si and es:di register pairs to point to the start of the first segment in the memory; and until all the segments in the memory have been pointed to by the ds register, repeating the steps of until the ds:si register pair points to an allocated block, advancing the si register to point to the next allocated block in the segment pointed to by the ds register, and when there is no next allocated block in the segment pointed to by the ds register, advancing the ds register to point to the next segment in the memory and setting the si register to point to the start of the segment pointed to by the ds register;

determining the size of the area between the location pointed to by the es:di register pair and the end of the segment pointed to by the es register, and when the determined size of the area is less than the size of the block pointed to by the ds:si register pair, advancing the es register to point to the next segment in the memory and setting the di register to point to the start of the segment pointed to by the es register; and moving the data in the block pointed to by the ds:si register pair to the area pointed to by the es:di register pair and advancing the si and di registers by the size of the block.

8. A method in a computer system for reducing loading of segment registers when coalescing a multi-segment heap, the computer system having a source segment register and a source offset register and having a destination segment register and a destination offset register, each segment comprising blocks, each segment having a segment location, the segments being ordered from a first to a last segment, each block having a location, each block being free or allocated, each allocated block being locked or not locked, the blocks within each segment being ordered from a first to a last block, the method comprising the steps of:

loading the source segment register and the destination segment register with values pointing to the segment location of the first segment;

loading the source offset register and the destination offset register with values pointing to the location of the first block in the first segment; and repeating the following steps until the source segment register and the source offset register have pointed to the location of each block in each segment, when a working area is as large as the block pointed to by the source segment register and the source offset register, copying the block pointed to by the source segment register and the source offset register to the block starting at the location pointed to by the destination segment register and the destination offset register;

incrementing the value in the destination offset register by the size of the copied block;

when the destination segment register and the destination offset register point past the last location of the segment pointed to by the destination segment register, loading the destination segment register and the destination offset register with values pointing to the location of the first block in the next segment after the segment pointed to by the destination segment register;

incrementing the value in the source offset register by the size of the copied block; and when the source segment register and the source offset register point past the last location of the segment pointed to by the source segment register, loading the source segment register and the source offset register with values pointing to the location of the first block in the next segment after the segment pointed to by the source segment register; and when a working area is not as large as the block pointed to by the source segment register and the source offset register, creating a free block of the working area;

incrementing the value in the destination offset register by the size of the copied block; and when the destination segment register and the destination offset register point past the last location of the segment pointed to by the destination segment register, loading the destination segment register and the destination offset register with the location of the first block in the next segment after the segment pointed to by the destination segment register; and creating free blocks of the blocks following the block pointed to by the destination segment register and the destination offset register, wherein the working area being, when there is a locked block in the segment pointed to by the destination segment register after the location pointed to by the destination offset register, the area between the location pointed to by the destination segment register and the destination offset register and the location of the locked block, and, when there is no locked block in the segment pointed to by the destination segment register after the location pointed to by the destination offset register, the area between the location of the block pointed to by the destination segment register and the destination offset register and a last location in the segment pointed to by the destination segment register.

9. A method in a computer system for heap coalescing, the heap having a plurality of memory locations, the memory locations being ordered from a first memory location to a last memory location, the memory locations being grouped into segments of memory locations, the segments being logically ordered from a first segment to a last segment, the memory locations within a segment being grouped into blocks, each block having a size and being either allocated or free, comprising:

designating the first segment as the destination segment; and for each of the plurality of segments starting with the first segment and continuing through the last segment, designating the segment as the source segment; and for each of the plurality of allocated blocks within the source segment, when an area from the first memory location of the destination segment to which an allocated block has not yet been copied during heap coalescing and the last memory location of the destination segment has a size that is equal to or greater than the size of the allocated block, copying the allocated block to the destination segment starting at the first memory location of the destination segment to which an allocated block has not yet been copied during heap coalescing; and when the area from the first memory location of the destination segment to which an allocated block has not yet been copied during coalescing and the last memory location of the destination segment has a size that is less than the size of the allocated block, designating the next segment after the destination segment as the destination segment; and copying the allocated block to the first memory location of the destination segment.

10. A memory containing instructions for causing a computer system to coalesce a heap having segments, each segment having blocks that are either allocated or free, the computer system having a source segment register and a destination segment register for indicating a source segment from which an allocated block is to be copied and a destination segment to which an allocated block is to be copied, the segments being logically ordered from a first segment to a last segment, by the steps of:

loading the destination segment register with an indication of the first segment; and for each of the plurality of segments starting with the first segment through the last segment, loading the source segment register with an indication of the segment; and for each of the plurality of allocated blocks within the segment indicated by the source segment register, when the allocated block will not fit within the segment indicated by the destination segment register, loading the destination segment register with an indication of the segment logically ordered after the segment currently indicated by the destination segment register; and copying the allocated block to the segment indicated by the destination segment register.

* * * * *